(12) United States Patent
Jin

(10) Patent No.: US 12,480,574 B2
(45) Date of Patent: Nov. 25, 2025

(54) TRANSMISSION

(71) Applicant: Hyundai Transys Inc., Seosan-si (KR)

(72) Inventor: Joo Seok Jin, Hwaseong-si (KR)

(73) Assignee: Hyundai Transys Inc., Seosan-si (KR)

( * ) Notice: Subject to any disclaimer, the term of this patent is extended or adjusted under 35 U.S.C. 154(b) by 7 days.

(21) Appl. No.: 18/686,937

(22) PCT Filed: Dec. 13, 2021

(86) PCT No.: PCT/KR2021/018888
§ 371 (c)(1),
(2) Date: Feb. 27, 2024

(87) PCT Pub. No.: WO2023/038204
PCT Pub. Date: Mar. 16, 2023

(65) Prior Publication Data
US 2025/0035208 A1 Jan. 30, 2025

(30) Foreign Application Priority Data
Sep. 13, 2021 (KR) .......................... 10-2021-0121972

(51) Int. Cl.
*F16H 57/04* (2010.01)
*F04C 2/344* (2006.01)

(52) U.S. Cl.
CPC .......... *F16H 57/0441* (2013.01); *F04C 2/344* (2013.01)

(58) Field of Classification Search
CPC .. F16H 57/0441; F16H 57/0436; F04C 2/344; F04C 15/00; F04C 2240/805
See application file for complete search history.

(56) References Cited

U.S. PATENT DOCUMENTS

| 10,935,117 | B1 | 3/2021 | Bennett | |
|---|---|---|---|---|
| 2012/0011961 | A1* | 1/2012 | Frait | F16H 61/0009 74/606 R |
| 2015/0316142 | A1 | 11/2015 | Steward et al. | |
| 2016/0223070 | A1* | 8/2016 | Kito | F16H 57/0441 |
| 2018/0306182 | A1 | 10/2018 | Maki et al. | |
| 2021/0254619 | A1* | 8/2021 | Welte | F04C 29/02 |

FOREIGN PATENT DOCUMENTS

| JP | 2017066937 A | 4/2017 |
|---|---|---|
| JP | 2017-110573 A | 6/2017 |
| KR | 1020080094074 A | 10/2008 |
| KR | 1020090034792 A | 4/2009 |
| KR | 1020130016624 A | 2/2013 |
| KR | 101879663 B1 | 7/2018 |
| KR | 102192509 B1 | 12/2020 |

* cited by examiner

Primary Examiner — Bryan M Lettman
(74) Attorney, Agent, or Firm — Bridgeway IP Law Group, PLLC; Jihun Kim

(57) ABSTRACT

A transmission is capable of optimizing mountability of the transmission in a vehicle by improving an arrangement position of an electric oil pump on the transmission. The transmission according to one embodiment includes a housing, a support part coupled to the housing, and a pump coupled to the support part and disposed to be spaced apart from a frame of the vehicle.

6 Claims, 4 Drawing Sheets

TRANSMISSION

TECHNICAL FIELD

The present invention relates to a transmission, and more particularly, to a transmission with an optimized ability to be mounted in a vehicle.

BACKGROUND ART

As a start clutch, instead of a torque converter, is applied to a double-clutch transmission, a hybrid transmission, an automatic transmission, or the like, the RPM of a pump is adjusted to be suitable for a required flow rate by applying an electric oil pump (EOP) instead of a mechanical oil pump to minimize a loss of power.

That is, recently, the double-clutch transmission, the hybrid transmission, the automatic transmission, or the like has efficiently managed hydraulic pressure to be supplied to control oil (friction members such as a clutch, a brake, and the like that selectively operate during a shifting process) and lubrication oil (cooling and lubrication) by using the electric oil pump.

For example, the electric oil pump has a structure including a motor and a pump. When the pump is operated by the motor in a state in which the pump is immersed in the oil, a line pressure flow path is formed as the oil is introduced into an oil intake port to an oil discharge port. In addition, an accumulator is provided in the line pressure flow path and stores hydraulic pressure while controlling a hydraulic shock, and a plurality of solenoid valves controls the line pressure to operate the friction member such as the clutch or the brake.

With reference to FIG. 1, in the case of a hybrid transmission in the related art, an electric oil pump (EOP) 10' is mounted on an outer portion of a transmission 100'. In case that the electric oil pump 10' is mounted on the outer portion of the transmission 100' as described above, the electric oil pump 10' may sometimes interfere with a radiator part 20' (or a frame of a vehicle) in some vehicles.

Therefore, it is difficult to mount the transmission 100', in which the electric oil pump 10' is mounted on the outer portion thereof, to various vehicles with different internal standards or layouts of components disposed in the transmission. For this reason, there is a problem in that shapes and arrangements of some components including the electric oil pump 10' need to be inevitably changed to prevent interference in developed vehicles.

DISCLOSURE

Technical Problem

The present invention has been made in an effort to solve the above-mentioned problem, and an object of the present invention is to provide a transmission capable of optimizing mountability of the transmission in a vehicle by improving an arrangement position of an electric oil pump on the transmission.

Technical Solution

A transmission according to an embodiment of the present invention includes a housing, a support part coupled to the housing, and a pump coupled to the support part and disposed to be spaced apart from a frame of the vehicle.

In particular, the pump may include: a pumping part integrally coupled to the support part; a cover part coupled to one side of the pumping part; and a motor part coupled to the other side of the pumping part and configured to provide power to the pumping part.

In particular, the motor part may be disposed to be spaced apart from the frame of the vehicle.

In particular, the pump may be a vane pump.

In particular, the pumping part may include: a cam ring to the support part; a rotor provided in the cam ring; and vanes connected to the rotor and disposed to adjoin the cam ring.

In particular, the vane may include: a first vane; and a second vane disposed to intersect the first vane.

In particular, the support part may support an input shaft of the transmission.

Advantageous Effects

According to the present invention, it is possible to minimize interference between the pump and the frame of the vehicle or the components in the vehicle, which may optimize the mountability of the transmission in the vehicle regardless of the type of vehicle.

In addition, according to the present invention, the rotational speed of the motor part of the pump is reduced with the flow rate of the transmission working fluid remaining the same, which may improve the fuel economy of the vehicle.

In addition, according to the present invention, the electric current of the motor part of the pump is reduced with the flow rate of the transmission working fluid remaining the same, which may improve the fuel economy of the vehicle and design a low motor capacity, thereby reducing costs.

MODE FOR INVENTION

Figure 1:
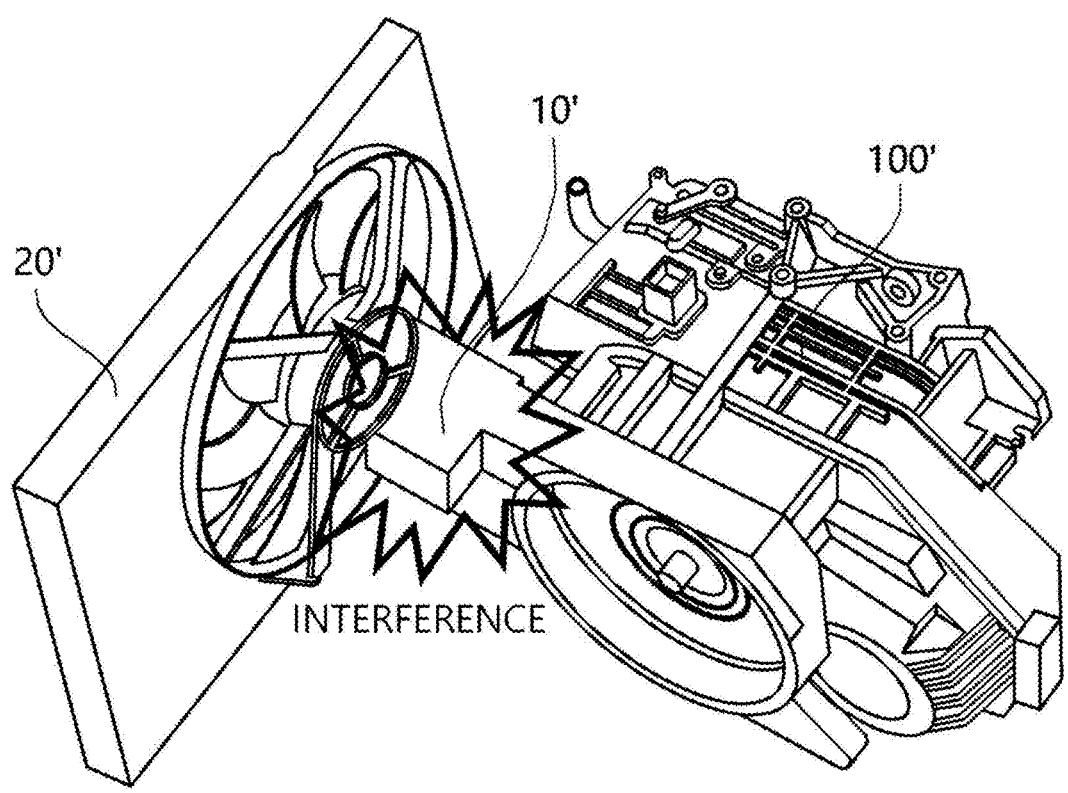
FIG. 1 is a view illustrating a transmission on which an electric oil pump is mounted in the related art.

Hereinafter, exemplary embodiments of the present invention will be described in detail with reference to the accompanying drawings. First, in assigning reference numerals to constituent elements of the respective drawings, it should be noted that the same constituent elements will be designated by the same reference numerals, if possible, even though the constituent elements are illustrated in different drawings. In addition, in the description of the present invention, the specific descriptions of publicly known related configurations or functions will be omitted when it is determined that the specific descriptions may obscure the subject matter of the present invention. Further, the exemplary embodiments of the present invention will be described below, but the technical spirit of the present invention is not limited thereto and may of course be modified and variously carried out by those skilled in the art.

Figure 2:
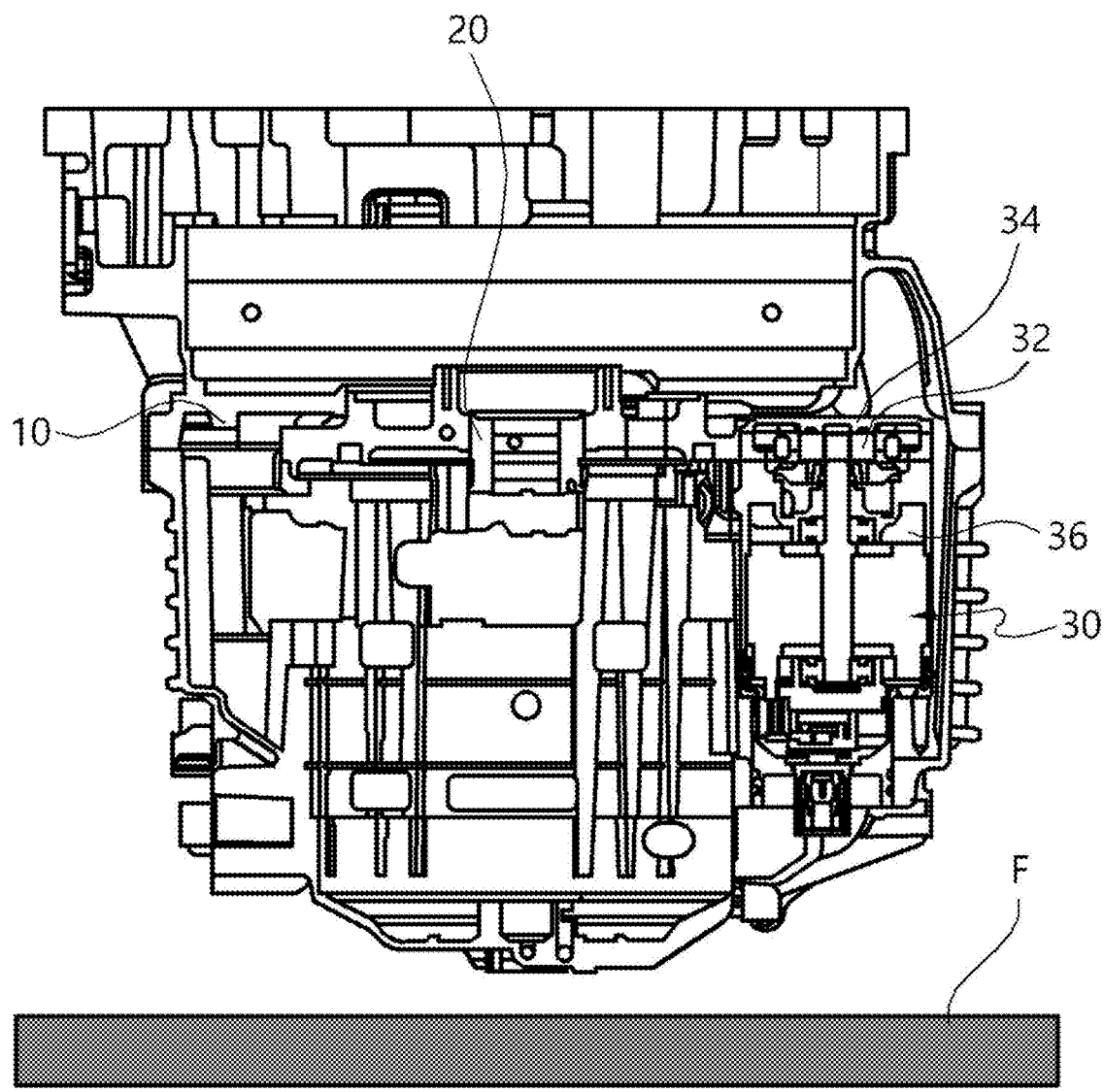
FIG. 2 is a view illustrating an arrangement of a pump on a transmission according to an embodiment of the present invention.

FIG. 2 is a view illustrating an arrangement of a pump 30 on a transmission 100 according to an embodiment of the present invention.

With reference to FIG. 2, the transmission 100 includes a housing 10, a support part 20, and the pump 30. In this case, the transmission 100 may be mounted in a vehicle (e.g., a hybrid vehicle).

Components (not illustrated) and a motor (not illustrated), which serve to shift the vehicle, may be provided in the housing 10. In addition, although not illustrated, an engine, a battery, and the like may be further provided in the vehicle.

The support part 20 may be coupled to the housing 10. The support part 20 may be configured to support an input shaft (not illustrated) of the transmission 100.

The pump 30 may be a kind of electric oil pump (EOP).

The pump 30 may be mounted on an outer portion of the transmission 100. In detail, the pump 30 may be coupled to the support part 20 coupled to the housing 10 of the transmission 100.

In this case, the pump 30 coupled to the support part 20 may be disposed to be spaced apart from a frame F of the vehicle.

Figure 3:
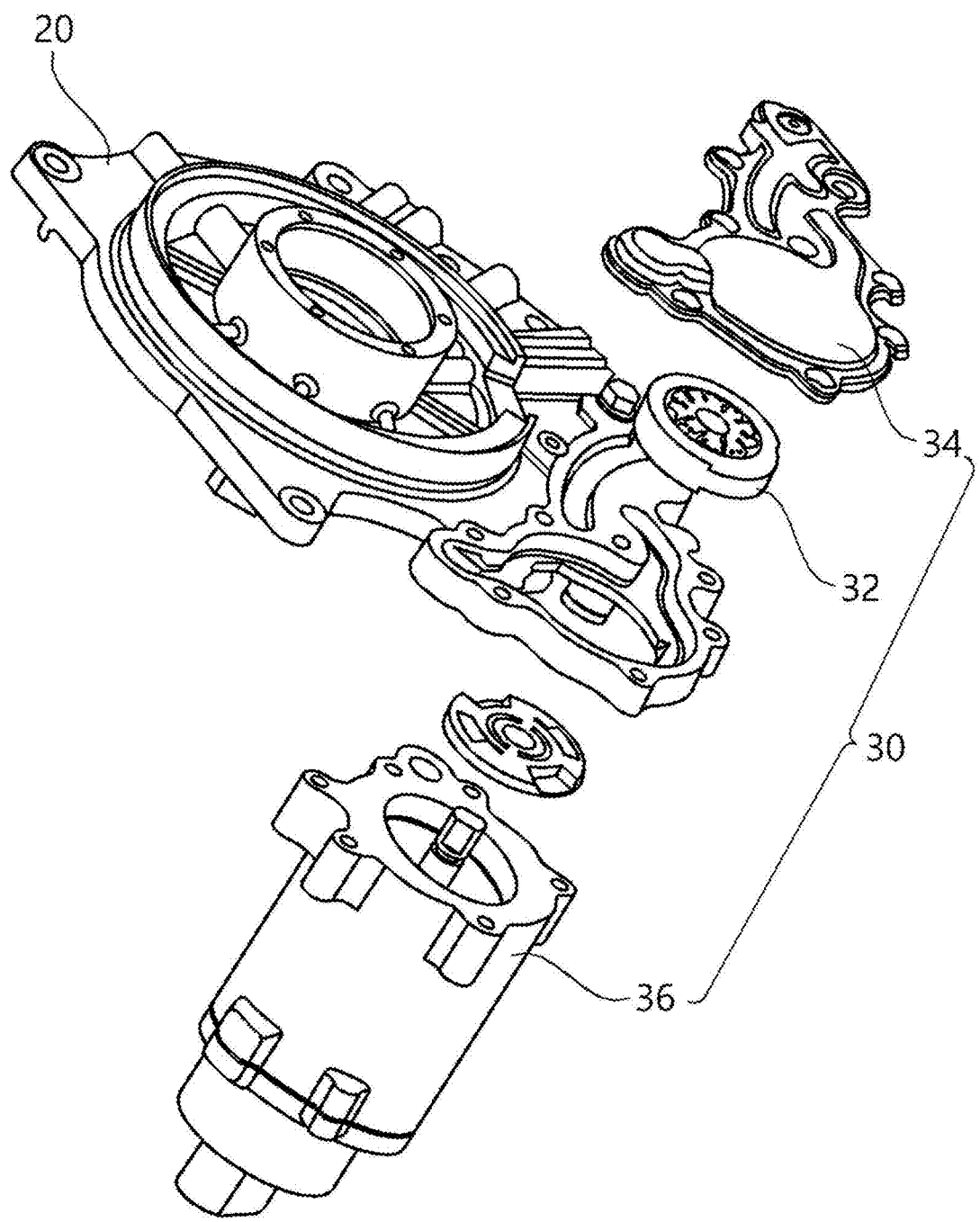
FIG. 3 is a view illustrating a coupling relationship between a support part and the pump provided on the transmission.

FIG. 3 is a view illustrating a coupling relationship between the support part 20 and the pump 30 provided on the transmission 100.

With reference to FIG. 3, the pump 30, which is a kind of electric oil pump, includes a pumping part 32, a cover part 34, and a motor part 36.

As illustrated in FIGS. 2 and 3, the pumping part 32 may be integrally coupled to the support part 20.

The cover part 34 may be axially coupled to one side (directed toward the housing 10) of the pumping part 32 to prevent foreign substances from being introduced into the pumping part 32.

The motor part 36 may be axially coupled to the other side (directed toward the frame F of the vehicle) of the pumping part 32 to provide power for operating the pumping part 32.

For example, the pump 30 may have a structure configured to form a line pressure flow path while introducing oil (transmission working fluid) into an oil intake port (not illustrated, capable of being provided in the support part 20) and discharging the oil through an oil discharge port (not illustrated, capable of being provided in the support part 20) when the pumping part 32 is operated by the motor part 36.

In this case, as illustrated in FIGS. 2 and 3, the motor part 36 may be disposed to be spaced apart from the frame F of the vehicle in the state in which the pump 30 is coupled to the support part 20.

As described above, the pumping part 32 of the pump 30 is integrally coupled to the support part 20 that supports the input shaft of the transmission 100, which may reduce an overall length of the transmission 100 in a direction of the input shaft in the structure in which the support part 20 and the pump 30 are coupled in comparison with the structure in which the pumping part 32 is provided in the motor part 36.

Therefore, because the pump 30 is disposed to be spaced apart from the frame F of the vehicle, it is possible to minimize interference between the pump 30 and the frame F of the vehicle or the components (e.g., a radiator and the like) in the vehicle. Therefore, it is possible to optimize the mountability of the transmission 100 in the vehicle regardless of the type of vehicle.

In addition, because the motor part 36 is axially coupled in the state in which the pumping part 32 is integrally coupled to the support part 20 without being coupled in the motor part 36, it is possible to define a flow path along a lateral side of the pumping part 32.

Figure 4:
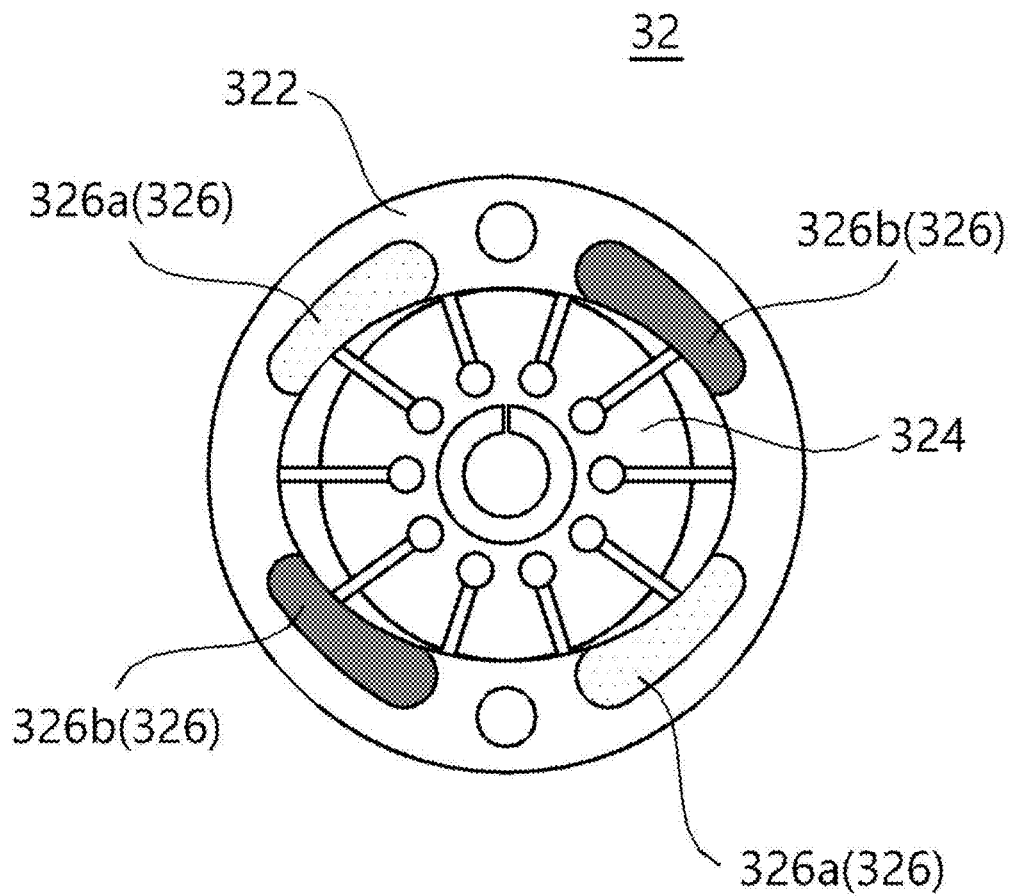
FIG. 4 is a view specifically illustrating a configuration of a pumping part provided in the pump.

FIG. 4 is a view specifically illustrating a configuration of the pumping part 32 provided in the pump 30.

In the transmission 100 according to the embodiment of the present invention, the pump 30 may be a vane pump, particularly a binary vane pump.

With reference to FIG. 4, the pumping part 32 of the pump 30 includes a cam ring 322 coupled to the support part 20, a rotor 324, and vanes 326.

The rotor 324 may be provided in the cam ring 322, and the vanes 326 may be connected to the rotor 324 and disposed to adjoin the cam ring 322.

In this case, the vanes 326 may include a first vane 326a, and a second vane 326b disposed to intersect the first vane 326a.

For example, the first vane 326a may be disposed at an intake side of the transmission working fluid, and the second vane 326b may be disposed at a discharge side of the transmission working fluid. In this case, the transmission working fluid may be introduced into the rotor 324 in two directions by means of the first vane 326a. The transmission working fluid, which is introduced into the rotor 324 in the two directions by means of the second vane 326b, may be discharged by a rotation of the rotor 324.

As illustrated in FIG. 4, the bidirectional introduction and the bidirectional discharge of the transmission working fluid may be performed by the first vane 326a and the second vane 326b.

In addition, because the binary vane pump is applied to the transmission 100 according to the present invention, the layout may be optimized by the bidirectional introduction and the bidirectional discharge of the transmission working fluid in comparison with a rotary pump in the related art. Further, because a tip clearance, which is present in the rotary pump in the related art, is removed, it is possible to improve the volume efficiency of the electric oil pump. When the volume efficiency of the electric oil pump is improved as described above, a rotational speed of the motor part 36 is reduced with a flow rate of the transmission working fluid remaining the same, which may improve fuel economy of the vehicle.

In addition, in comparison with the rotary pump in the related art, a contact area between the cam ring 322 and the cover part 34 is reduced, which may reduce driving torque of the electric oil pump. When the driving torque of the electric oil pump is reduced as described above, the electric current of the motor part 36 is reduced with the flow rate of the transmission working fluid remaining the same, which may improve fuel economy of the vehicle and design a low motor capacity, thereby reducing costs.

The above description is simply given for illustratively describing the technical spirit of the present invention, and those skilled in the art to which the present invention pertains will appreciate that various modifications, changes, and substitutions are possible without departing from the essential characteristic of the present invention. Accordingly, the embodiments disclosed in the present invention and the accompanying drawings are intended not to limit but to describe the technical spirit of the present invention, and the scope of the technical spirit of the present invention is not limited by the embodiments and the accompanying drawings. The protective scope of the present invention should be construed based on the following claims, and all the technical spirit in the equivalent scope thereto should be construed as falling within the scope of the present invention.

The invention claimed is:

1. A transmission mounted in a vehicle, the transmission comprising:
a housing;

a support part coupled to the housing; and
a pump coupled to the support part and disposed to be spaced apart from a frame of the vehicle,
wherein the pump comprises:
a pumping part integrally coupled to the support part, the pumping part and the support part being disposed on a same plane;
a cover part coupled to one side of the pumping part, the cover part covering the pumping part and at least one portion of the support part disposed on the same plane; and
a motor part coupled to another side of the pumping part and configured to provide power to the pumping part.

2. The transmission of claim 1, wherein the motor part is disposed to be spaced apart from the frame of the vehicle.

3. The transmission of claim 1, wherein the pump is a vane pump.

4. The transmission of claim 1, wherein the pumping part comprises:
a cam ring coupled to the support part;
a rotor disposed in the cam ring; and
vanes connected to the rotor and disposed to adjoin the cam ring.

5. The transmission of claim 4, wherein the vanes comprise:
a first vane; and
a second vane disposed to intersect the first vane.

6. The transmission of claim 1, wherein the support part supports an input shaft of the transmission.

* * * * *